US008613025B2

(12) United States Patent  
Narayanan et al.

(10) Patent No.: US 8,613,025 B2
(45) Date of Patent: Dec. 17, 2013

(54) METHOD AND APPARATUS FOR SELECTING ONE OF A PLURALITY OF VIDEO CHANNELS FOR VIEWINGS

(75) Inventors: Venkatasubramanian Narayanan, Bangalore (IN); Padma Lakshmi Anoop Kulkarni, Bangalore (IN); Sajid Saiyed, Pune (IN); Vijayan Venkataraman, Bangalore (IN); Sanjay Bhat, Bangalore (IN)

(73) Assignee: TP Vision Holding B.V, Eindhoven (NL)

( * ) Notice: Subject to any disclaimer, the term of this patent is extended or adjusted under 35 U.S.C. 154(b) by 37 days.

(21) Appl. No.: 12/599,112

(22) PCT Filed: May 5, 2008

(86) PCT No.: PCT/IB2008/051738
§ 371 (c)(1),
(2), (4) Date: Sep. 16, 2010

(87) PCT Pub. No.: WO2008/135947
PCT Pub. Date: Nov. 13, 2008

(65) Prior Publication Data
US 2011/0016491 A1 Jan. 20, 2011

(30) Foreign Application Priority Data

May 8, 2007 (EP) .................................. 07107706

(51) Int. Cl.
G06F 3/00 (2006.01)
(52) U.S. Cl.
USPC ............... 725/56; 725/38; 725/39; 725/40; 725/41; 725/42; 725/43; 725/44; 725/45; 725/46; 725/47; 725/57; 725/97; 348/14.11; 348/14.12; 348/14.13; 348/14.14; 348/14.15; 386/337; 386/338; 386/339; 386/340; 386/341

(58) Field of Classification Search
None
See application file for complete search history.

(56) References Cited

U.S. PATENT DOCUMENTS

| 5,602,597 | A  | * | 2/1997  | Bertram ........................... 725/56 |
| 5,805,235 | A  |   | 9/1998  | Bedard |
| 5,818,512 | A  | * | 10/1998 | Fuller ............................. 725/82 |
| 6,335,736 | B1 | * | 1/2002  | Wagner et al. ................ 715/716 |
| 6,868,225 | B1 | * | 3/2005  | Brown et al. ................. 386/239 |
| 7,030,890 | B1 | * | 4/2006  | Jouet et al. .................... 345/619 |
| 7,373,652 | B1 | * | 5/2008  | Bayrakeri et al. ............. 725/53 |
| 7,765,568 | B1 | * | 7/2010  | Gagnon et al. ................ 725/38 |
| 7,987,477 | B2 | * | 7/2011  | Maynard et al. ............... 725/10 |
| 8,060,906 | B2 | * | 11/2011 | Begeja et al. .................. 725/46 |
| 2002/0075408 | A1 | * | 6/2002  | Curreri ......................... 348/569 |
| 2002/0152462 | A1 | * | 10/2002 | Hoch et al. ..................... 725/37 |
| 2002/0175953 | A1 |   | 11/2002 | Lin |
| 2003/0159147 | A1 |   | 8/2003  | Young et al. |

(Continued)

FOREIGN PATENT DOCUMENTS

| EP | 0715456 A2 * | 3/1995 |
| EP | 0715456 A2   | 6/1996 |
| WO | 9737490 A1   | 10/1997 |
| WO | 0062533 A1   | 10/2000 |

*Primary Examiner* — Nasser Goodarzi
*Assistant Examiner* — Paul Graham
(74) *Attorney, Agent, or Firm* — Shimokaji & Assoc., P.C.

(57) ABSTRACT

One of a plurality of video channels is selected for viewing. A specific one of a plurality of video channels is bookmarked. An object representing said bookmarked channel is displayed. A displayed object is selected to select the bookmarked channel.

9 Claims, 2 Drawing Sheets

(56) References Cited

U.S. PATENT DOCUMENTS

| | | |
|---|---|---|
| 2004/0059720 A1 | 3/2004 | Rodriguez |
| 2005/0114897 A1* | 5/2005 | Cho et al. .......................... 725/88 |
| 2005/0166230 A1* | 7/2005 | Gaydou et al. .................. 725/41 |
| 2005/0166232 A1* | 7/2005 | Lamkin et al. .................. 725/43 |
| 2006/0064716 A1* | 3/2006 | Sull et al. ........................ 725/37 |
| 2008/0059884 A1* | 3/2008 | Ellis et al. ...................... 715/721 |
| 2008/0066106 A1* | 3/2008 | Ellis et al. ........................ 725/40 |
| 2009/0300480 A1* | 12/2009 | Cohen et al. .................. 715/234 |
| 2010/0115557 A1* | 5/2010 | Billmaier et al. ................ 725/44 |

* cited by examiner

METHOD AND APPARATUS FOR SELECTING ONE OF A PLURALITY OF VIDEO CHANNELS FOR VIEWINGS

FIELD OF THE INVENTION

The present invention relates to a method and apparatus for selecting one of a plurality of video channels for viewing.

BACKGROUND OF THE INVENTION

In a conventional television system, a plurality of channels are utilized to broadcast, simultaneously, a plurality of programs to a television set. A user is then able to view any one of the plurality of channels received by the television. Further, the user may utilize personalized or virtual channels. The user may, for example, use a remote control to select between the channels.

However, with the increasing number of channels available to a user, it is increasingly difficult for the user to browse through the channels quickly. For example, a user may wish to browse through other channels during commercial breaks and then return to the main channel quickly. This is tedious and time consuming as the number of channels increase. Traditionally, the user remembers the channel number of the current channel in order to quickly return to it once he has finished browsing. Simple mechanisms for returning to the current channel like, for example, pressing a "Previous Program" key or "Alternate Channel" key are effective if the user has only browsed one other channel. However, these mechanisms are not effective when the user has browsed more than one other channel. Other mechanisms, such as the Electronic Program Guide or the "P+", "P−" keys can be used but do not enable the user to return to their current channel with a single key press.

There exists a method of bookmarking channels, in which a user can select a channel to be bookmarked. The bookmarked channels can then be recalled in the future so that the user is not required to remember the numbers associated with the channels, and is not required to browse the channels to find one of interest.

One known method for bookmarking channels can be found in the patent application WO 9737490. In this disclosure, programs or channels are bookmarked for later selection. At any time while watching the television, the viewer can bookmark programs or channels to which he or she wants to return quickly and/or at a later time by pressing a button on a remote control. When a channel or program is bookmarked, a checkmark is shown in the corner of the screen to indicate that the program is marked. The checkmark only remains visible for a short period of time. Furthermore, when a viewer switches channel, the checkmark disappears. The result of bookmarking more than one channel is that each bookmarked channel is added to a list. Then, when the user wishes to return to a bookmarked channel, they are required to press a Recall button. Upon pushing the recall button, the first bookmarked channel is recalled. The user is then required to press the recall button again to retrieve the second bookmarked channel and so on.

Further examples of known methods can be found in the patent applications US 2002/0075408 and WO 00/62533.

These known methods for selecting a preferred video channel for viewing require the user to browse through a list of bookmarked channels. This may be time consuming if the user has bookmarked many channels.

SUMMARY OF THE INVENTION

The present invention seeks to provide a simplified method for selecting one of a plurality of video channels for viewing that overcomes the disadvantages associated with existing methods. In particular, the present invention seeks to provide a method that enables the user to quickly return to a previously bookmarked video channel without the need to browse through all bookmarked video channels.

This is achieved, according to one aspect of the present invention, by a method for selecting one of a plurality of video channels for viewing, the method comprising the steps of: bookmarking a specific one of a plurality of video channels, displaying an object representing said bookmarked video channel, and selecting a displayed object to select said bookmarked video channel.

This is also achieved, according to a second aspect of the present invention, by an apparatus for selecting one of a plurality of video channels for viewing, the apparatus comprising: input interface means for enabling bookmarking of a specific one of a plurality of video channels, display controller means for enabling display of an object representing said bookmarked video channel, and wherein said input interface means and display controller means enable selection of a displayed object to select said bookmarked video channel.

In this way, a video channel is bookmarked to be returned to at a later time. The objects representing each of the bookmarked video channels are displayed until they are removed. This means that the object is displayed even when the program or channel being watched is not the bookmarked program or channel. This allows the user to quickly return to a previously bookmarked program by making a single selection (for example, by pressing a key or pointing and clicking on the required object). Also, since the displayed object represents the bookmarked video channel (for example, the object may be a logo associated with the bookmarked channel), the user is reminded of the content of the bookmarked video channel.

In an embodiment, only the objects representing channels not being shown are displayed to minimize the number of objects displayed and to improve navigation between the channels.

The step of displaying an object may comprise the step of: displaying the object as an overlay of a currently viewed video channel. In this way, the bookmarked video channel is displayed above the main video of the current video channel (like an On-Screen Display (OSD)). This means that the user can continually monitor the bookmarked video channels until a bookmarked video channel is removed. The user is therefore only required to make a single selection to return to a bookmarked video channel and is not required to first recall all bookmarked video channels. Furthermore, the user is able to bookmark video channels in normal viewing mode and does not need to stop viewing the current program to use a selection feature such as an EPG.

The step of bookmarking at least one of a plurality of video channels may comprise the step of: automatically bookmarking a currently viewed video channel when the currently viewed video channel has been viewed for a time period. In this way, the user is not required to press a button to bookmark the currently viewed video channel. Instead, the user can continue to view the current program without interruption.

The method may further comprise the step of: removing the displayed object upon selection of the object. In this way, the user can update the bookmarked video channels that they no longer wish to be bookmarked. The displayed objects are therefore kept to a minimum and a user can more easily select the required bookmarked video channel from the objects that are displayed.

The method may further comprise the step of: removing the displayed object if not selected for a time period. In this way, the user is not required to press a button remove a currently bookmarked video channel.

BRIEF DESCRIPTION OF THE DRAWINGS

For a more complete understanding of the invention, reference is made to the following description in conjunction with the accompanying drawings, in which.

DETAILED DESCRIPTION OF AN
EMBODIMENT OF THE INVENTION

Figure 1:
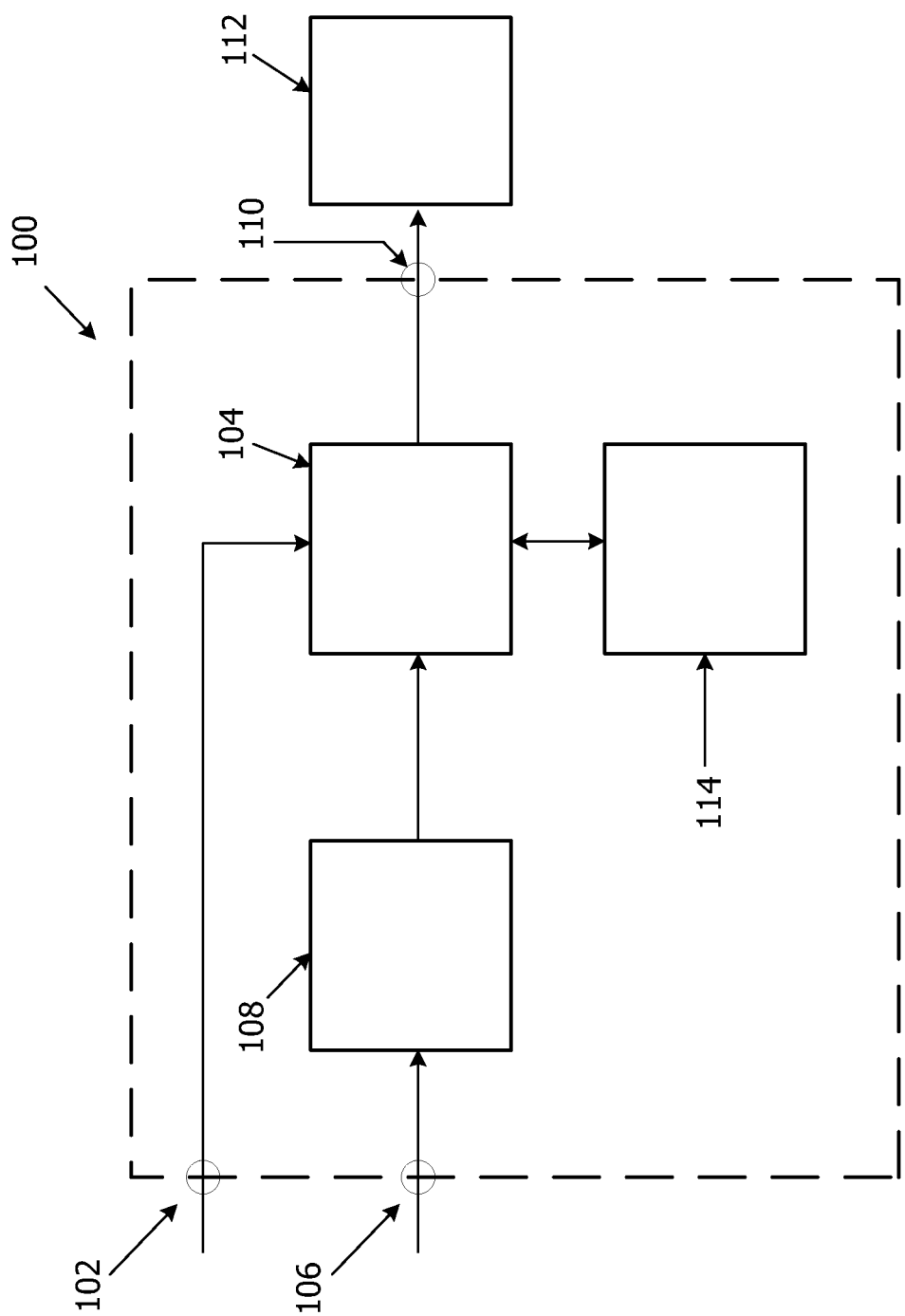
FIG. 1 is a simplified schematic of apparatus according to an embodiment of the present invention.

With reference to FIG. 1, the apparatus 100 of an embodiment of the present invention comprises a first input terminal 102 for input of a video channel. The video channel may, for example, be a broadcast channel or a virtual channel that a user has created to include their favorite programs. The video channel is input into a display controller means 104 via the first input terminal 102. The apparatus 100 also comprises an input interface means 108 for input of a user's input via a second input terminal 106. The output of the input interface means 108 is connected to the display controller means 104. The output of the display controller means 104 is connected to a display means 112 (for example, a television screen) via an output terminal 110. The display controller means 104 is also connected to a storage means 114. The display controller means 104 can communicate information to the storage means 114. Similarly, the storage means 114 can communicate information to the display controller means 104. It is to be noted that the apparatus 100 may be an integral part of a television or an additional set top box to use in conjunction with a conventional television.

Operation of the apparatus 100 of FIG. 1 will now be described with reference to FIGS. 1 and 2.

With reference to FIG. 1, the display controller means 104 receives a video channel via the first input terminal 102. The display controller means 104 inputs the video channel into the display means 112 via the output terminal 110. The display means 112 shows the video channel to a user. The user can select a video channel for viewing (i.e. change the video channel that the display means 112 is showing) by, for example, using a remote control (not shown here).

The input interface means 108 enables bookmarking of at least one of a plurality of video channels. In other words, a user is able to bookmark at least one of a plurality of video channels via the user interface means 108.

For example, when the display means 112 is showing a video channel of interest to the user, the user inputs a signal into the input interface means 108 via the second input terminal 106. The user may input a signal by using special keys on a remote control, for example. Alternatively, the user may use a favorite list or a history view to input a signal. When a signal is input into the input interface means 108 via the second input terminal 106, the input interface means 108 inputs the received signal into the display controller means 104.

The display controller means 104 then bookmarks the video channel currently received via the first input terminal 102 (i.e. the currently viewed video channel). The display controller means 104 inputs the bookmarked video channel into the storage means 114. The storage means 114 stores the bookmark for later retrieval.

The display controller means 104 may also automatically bookmark a currently viewed video channel when the currently viewed video channel has been viewed for a certain time period. A user is therefore given the possibility to bookmark a video channel and/or a video channel may be bookmarked automatically after a user views a video channel for a certain period of time.

The display controller means 104 enables display of an object representing each of the bookmarked video channels. For example, the display controller means 104 inputs the currently viewed video channel (received via the first input terminal 102) and an object representing each of the bookmarked video channels into the display means 112 via the output terminal 110.

The display means 112 then shows the currently viewed video channel and also displays an object representing each of the bookmarked video channels as an overlay.

Figure 2:
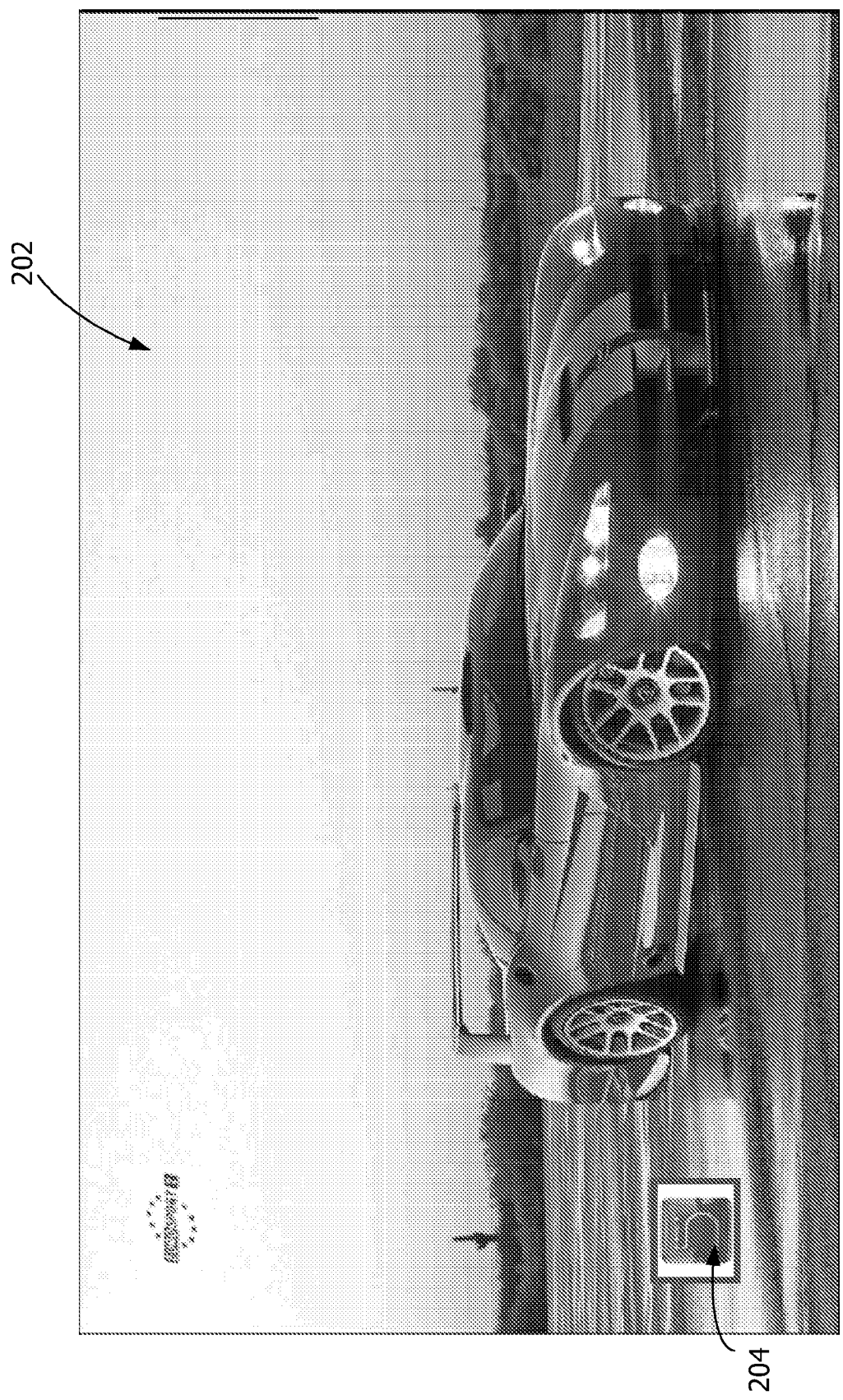
FIG. 2 is a snapshot of a currently viewed video channel displaying an object representing a bookmarked video channel.

An example of a display by the display means 112 is shown in FIG. 2. With reference to FIG. 2, the display means 112 shows the currently viewed video channel 202 and also displays an object 204 representing a bookmarked video channel. It is to be understood that the display means 110 may display a plurality of objects representing a plurality of bookmarked video channels. The display means 112 displays the object as an overlay of a currently viewed video channel. The displayed object 204 may, for example, be an indicator such as a logo of the bookmarked channel.

In an embodiment of the present invention, the display controller means 104 enables display of the object only when the bookmarked video channel represented by the object is not currently selected for viewing. In other words, the display controller means 104 only enables display of the object when the currently viewed video channel is not the same as the bookmarked video channel. In this way, the display means 112 displays an object representing each of the bookmarked video channels (except the currently viewed channel).

The input interface means 108 and the display controller means 104 enable selection of a displayed object to select the bookmarked video channel. In this way, a user is able to select a bookmarked video channel from the objects displayed by the display means 112.

For example, when the user wishes to select a bookmarked channel from the objects displayed on the display means 112, the user inputs a signal into the input interface means 108 via the second input terminal 106. The user may input a signal by using special keys on a remote control, for example. Alternatively, the user may input a signal by pointing and clicking on-screen or via a touch-sensitive screen. When a signal is input into the input interface means 108 via the second input terminal 106, the input interface means 108 inputs the received signal into the display controller means 104.

The display controller means 104 then retrieves the selected bookmarked video channel via the first input terminal 102 and the selected bookmarked video channel is then displayed. In this way, a user is able to quickly select and view a bookmarked video channel.

Upon selection of the object the display controller means 104 removes the displayed object. In this way, the display means 112 no longer displays the object representing the selected bookmarked video channel. The display means 112 may continue to display an object representing each of the other bookmarked channels.

The display controller means 104 may also remove a displayed object if not selected for a time period. In this way, only objects representing the most recently viewed bookmarked video channels are displayed on the display means 112.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method for selecting one of a plurality of video channels for viewing, the method comprising the steps of:
    bookmarking, via an input interface and a display controller, one of a plurality of video channels;
    displaying, via the display controller and a display screen, a first symbol representing said bookmarked video channel as an overlay over a portion of a currently presented video channel continually on the display screen until the displayed first symbol is removed;
    displaying continually on the display screen of the currently viewed video channel, other symbols different than the first symbol representing other bookmarked video channels of the plurality of video channels during display of the first symbol and upon removal from display of the first symbol, for corresponding video channels not currently being viewed on the display screen; and
    selecting, via the input interface, the displayed first symbol to select said bookmarked video channel, wherein responsive to selecting the displayed first symbol for viewing of the corresponding bookmarked video channel, outputting, via the display controller, said corresponding bookmarked video channel to the display for viewing, and wherein responsive to selecting the displayed first symbol for removing of the corresponding bookmarked video channel, removing, via the display controller, said selected displayed first symbol from the display screen.

2. The method according to claim 1, wherein said first symbol representing the bookmarked video channel is displayed only when said bookmarked video channel represented by said first symbol is not currently selected for viewing.

3. The method according to claim 1, wherein said step of bookmarking one of a plurality of video channels comprises the step of:
    automatically bookmarking the currently viewed video channel when said currently viewed video channel has been viewed for a certain time period.

4. The method according to claim 1, further comprising the step of:
    removing said displayed first symbol from the display if said displayed first symbol is not selected for a certain time period.

5. An apparatus for selecting one of a plurality of video channels for viewing, the apparatus comprising:
    an input interface configured to bookmark one of a plurality of video channels;
    a display controller configured to display a first symbol representing said bookmarked video channel via a display device, wherein the first symbol representing said bookmarked video channel is displayed as an overlay over a portion of a currently presented video channel continually on the display device until the displayed first symbol is removed, wherein the display controller is configured to continually display on the display device other symbols different than the first symbol representing other corresponding bookmarked video channels of the plurality of video channels, for corresponding video channels not currently being viewed on the display device; and
    wherein said input interface is further configured to provide selection of the displayed first symbol to select said bookmarked video channel, wherein responsive to selecting the displayed first symbol for viewing of a corresponding bookmarked video channel, the display controller outputting said corresponding bookmarked video channel to the display device for viewing, and wherein responsive to selecting the displayed first symbol for removing of a corresponding bookmarked video channel, the display controller removing said selected displayed first symbol from the display device.

6. The apparatus according to claim 5, wherein said display controller is configured to display said first symbol only when said bookmarked video channel represented by said first symbol is not currently selected for viewing.

7. A method, comprising:
    bookmarking one or more video channels;
    representing respective one or more video channels with respective bookmark symbols;
    displaying at least one of the bookmark symbols representing one of the bookmarked video channels during display of a currently presented program, wherein programming content of the bookmarked video channels is not displayed during display of the currently presented program; and
    retrieving, upon a selection of the at least one bookmark symbol, display of the bookmarked video channel corresponding to the bookmark symbol.

8. The method of claim, 7, wherein displaying the at least one bookmark symbol includes displaying a plurality of bookmark symbols and maintaining display of the plurality of bookmark symbols during display of programming content of the bookmarked video channel corresponding to the selected bookmark symbol.

9. The method of claim 8, including removing the selected bookmark symbol from display during display of programming content of the bookmarked video channel corresponding to the selected bookmark symbol.

* * * * *